Patented July 5, 1949

2,474,818

UNITED STATES PATENT OFFICE 2,474,818

QUINOLINE COMPOUNDS AND PROCESS OF MAKING SAME

Joseph H. Burckhalter, Detroit, Eldon M. Jones and Albert L. Rawlins, Grosse Pointe Woods, Frank H. Tendick, Grosse Pointe Park, and Walter F. Holcomb, Detroit, Mich., assignors to Parke, Davis & Company, Detroit, Mich., a corporation of Michigan No Drawing. Application September 29, 1944, Serial No. 556,496

12 Claims. (Cl. 260—286)

The invention relates to a class of new chemical compounds having the general formula for the free base:

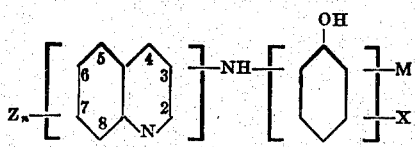

where $Z_n$ represents $n$ substituents Z, $n$ being 1, 2 or 3, and Z is a substituent of the class consisting of —$NO_2$ substituted or unsubstituted amino and groups hydrolyzable thereto, —OH, —CN, halogen, lower alkyl, lower hydroxy alkyl, lower alkoxy, phenyl, and amino substituted phenyl.

M in the above formula is a group in either the ortho or para position to the hydroxy group in said formula, said group M itself having the formula

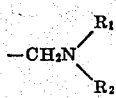

in which $R_1$ and $R_2$ may be hydrogen, an alkyl group (saturated or unsaturated), containing 1 to 4 carbon atoms, or a hydroxyalkyl group containing 1 to 4 carbon atoms; $R_1$ and $R_2$ may or may not be identical.

X in the above formula represents hydrogen, chlorine, bromine, hydroxy, lower alkoxy, lower alkyl (saturated or unsaturated) phenyl or it may be the same as M. These compounds are useful therapeutic agents and, in general, they are characterized by their toxicity to protozoa, particularly plasmodia. These new compounds may be used in the form of their salts of hydrochloric acid, sulfuric acid, phosphoric acid, sulfamic acid, acetic acid, lactic acid, tartaric acid, gluconic acid, citric acid, and alkyl sulfonic acids or as the insoluble salt of methylene disalicylic acid.

This application is a continuation-in-part of our copending application, Serial No. 539,990, filed June 12, 1944, now Patent No. 2,428,355, issued October 7, 1947.

The new compounds of the invention may be prepared by the condensation of certain intermediates which, for convenience, are herein designated as compounds A and B. Compound A has the general formula

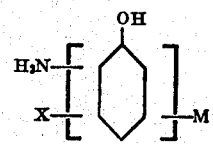

where M and X have the same significance as given above.

Compound B has the general formula

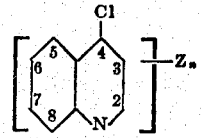

where $Z_n$ has the same significance as given above.

It should also be understood that instead of having a chloro group at position 4, the intermediate B may have other halogen groups in this position.

The condensation may be carried out by reacting equimolar portions of compounds A and B in a suitable solvent. The reaction may be carried out in alkaline, neutral or acid solution but preferably it is carried out in the presence of a mineral acid.

The following specific examples are illustrative:

*Example 1.—7-chloro-4-(3'-diethylaminomethyl-4'-hydroxyphenylamino) quinoline*

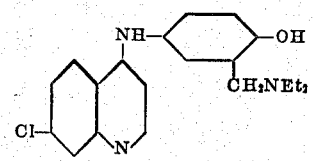

2-diethylaminomethyl - 4 - acetylaminophenol (64.0 g.) is refluxed with 128 cc. of concentrated HCl for one hour. The cooled solution is adjusted to pH 4 by adding 40% NaOH and 49.5 g. of 4,7-dichloroquinoline in 50 cc. of alcohol is added. The reaction mixture is heated for four hours, diluted to 1500 cc. with boiling water, and the free base precipitated by adding concentrated ammonium hydroxide. This product is filtered off, washed with water and acetone, then recrystallized from Cellosolve. The 7-chloro-4-

(3' - diethylaminomethyl - 4' - hydroxyphenylamino) quinoline thus obtained melts at 207–208° C.

*Example 2.—7-chloro-3-methyl - (3' - diethylaminomethyl - 4' - hydroxyphenylamino) quinoline dihydrochloride*

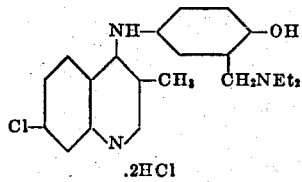

A mixture of 23.6 g. of 2-diethylaminomethyl-4-acetylaminophenol, 50 cc. of concentrated HCl, and 50 cc. of $H_2O$ is refluxed for 2 hours, then it is cooled and the pH adjusted to 4 by the addition of 40% KOH. The solution is then treated with 20 g. 3-methyl-4,7-dichloroquinoline and refluxed for 20 minutes. The clear solution is then cooled, alkalized with $NH_4OH$, and extracted with ether. The extract is then washed with water, dried over $MgSO_4$, and evaporated. The residue is dissolved in absolute ethanol and treated with alcoholic HCl. Upon standing, the solution deposits a solid hydrochloride. The compound has a melting point of 260° C. with decomposition.

*Example 3. — 6-methoxy-(3'-diethylaminomethyl-4'-hydroxyphenylamino) quinoline dihydrochloride*

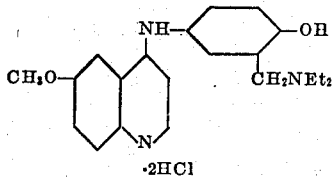

A mixture of 23.6 g. of 2-diethylaminomethyl-4-acetylaminophenol, 50 cc. of concentrated HCl, and 50 cc. of $H_2O$ is refluxed for 2 hours, then it is cooled and the pH adjusted to 4 by the addition of 40% KOH. The solution is then treated with 20 g. 4-chloro-6-methoxy quinoline and refluxed for 20 minutes. The clear solution is then cooled, alkalized with $NH_4OH$, and extracted with ether. The extract is then washed with water, dried over $MgSO_4$, and evaporated. The residue is dissolved in absolute ethanol and treated with alcoholic HCl. Upon standing, the solution deposits a solid hydrochloride. The compound decomposes at 270° C.

Other compounds of this invention may be prepared in a similar manner by condensing compounds A and B. The following are representative examples of compound A:

1. 2-diethylaminomethyl-4-t-butyl - 6 - aminophenol
2. 2-diethylaminomethyl-4-amino - 6 - chlorophenol
3. 2-diethylaminomethyl-4-amino - 6 - methylphenol
4. 2-diethylaminomethyl - 4 - amino - 6 - methoxyphenol
5. 2 - diethylaminomethyl-4-amino-6-hydroxyphenol
6. 2 - diethylaminomethyl-4-chloro - 6 - aminophenol
7. 2-diethylaminomethyl-4-phenyl - 6 - aminophenol
8. 2-diethylaminomethyl-4-amino - 6 - phenylphenol
9. 2 - diethylaminomethyl-4-amino - 3,5,6 - trimethylphenol
10. 2-diethylaminomethyl-4-amino - 6 - allylphenol
11. 2 - diethylaminomethyl - 4 - amino - 5,6 - dichlorophenol
12. 2 - diethylaminomethyl - 4 - amino - 3,6 - dichlorophenol
13. 2 - diethylaminomethyl - 4 - amino - 3,5 - dichlorophenol
14. 2-diethylaminomethyl - 4 - amino - 3,5,6 - trichlorophenol
15. 2 - diethylaminomethyl-4-amino - 6 - bromophenol
16. 2-diethylaminomethyl-4-amino - 5 - methyl-6-chlorophenol
17. 2-diethylaminomethyl-3-methyl - 4 - amino-6-chlorophenol
18. 2 - diethylaminomethyl-3-chloro - 4 - amino-6-methylphenol
19. 2 - diethylaminomethyl-4-amino-5-methoxy-6-chlorophenol
20. 2 - diethylaminomethyl-3-methoxy-4-amino-6-chlorophenol
21. 2 - diethylaminomethyl-3-chloro - 4 - amino-6-methoxyphenol
22. 2 - diethylaminomethyl-3-cyano - 4 - aminophenol
23. 2 - diethylaminomethyl-4-amino - 5 - cyanophenol
24. 2 - diethylaminomethyl-4-amino - 6 - cyanophenol
25. 2 - diethylaminomethyl - 3 - diethylamino-4-aminophenol
26. 2-diethylaminomethyl-4-amino - 5 - diethylaminophenol
27. 2-diethylaminomethyl-4-amino - 6 - diethylaminophenol
28. 2 - diethylaminomethyl-4-amino-3,6-dimethoxyphenol
29. 2 - diethylaminomethyl-4-amino-5,6-dimethoxyphenol
30. 2-diethylaminomethyl - 4 - amino-6-t-butylphenol
31. 2-diethylaminomethyl-4-amino-5,6-dimethylphenol
32. 2-diethylaminomethyl-4-amino-3,5-dimethylphenol
33. 2-diethylaminomethyl-4-amino-3,6-dimethylphenol
34. 2-diethylaminomethyl-3-methyl - 4 - amino-6-methoxyphenol
35. 2 - diethylaminomethyl-3-methoxy-4-amino-6-methylphenol
36. 2-diethylaminomethyl-6-aminophenol
37. 2-dimethylaminomethyl-4-aminophenol
38. 2,4-bis-diethylaminomethyl-6-aminophenol
39. 2,6-bis-diethylaminomethyl-4-aminophenol
40. 2-phenyl-4-diethylaminomethyl - 6 - aminophenol
41. 2-di($\beta$-hydroxyethyl)aminomethyl - 4 - aminophenol
42. 2-ethylaminomethyl-4-aminophenol The following are representative examples of compound B:

1. 4-chloro-5,6-dimethoxy-quinoline
2. 4-chloro-7-cyano-quinoline
3. 4-chloro-6-nitro-quinoline
4. 4-chloro-6-amino-quinoline
5. 4-chloro-6-hydroxy-quinoline
6. 4-chloro-6-$\beta$-hydroxyethoxy-quinoline
7. 4-chloro-8-hydroxyethoxy-quinoline
8. 4,5,8-trichloro-quinoline
9. 4,6,8-trichloro-quinoline
10. 2,4-dichloro-quinoline
11. 3,4-dichloro-quinoline 12. 4,6-dichloro-quinoline
13. 4,8-dichloro-quinoline
14. 2-chloro-quinoline
15. 2-chloro-5-nitro-quinoline
16. 4,5,7-trichloro-quinoline
17. 2,4-dichloro-quinoline
18. 2-chloro-4-hydroxy-quinoline
19. 4-chloro-2-hydroxy-quinoline
20. 4-chloro-2-ethoxy-quinoline
21. 4,6,7-trichloro-quinoline
22. 4-chloro-6-dimethylamino-quinoline
23. 4-chloro-6-nitro-8-methoxy-quinoline
24. 4-chloro-6,8-dimethyl-quinoline
25. 4,6-dichloro-8-methyl-quinoline
26. 4,6-dichloro-3-methyl-quinoline
27. 4,8-dichloro-3-methyl-quinoline
28. 4,6-dichloro-8-methoxy-quinoline
29. 4,7-dichloro-2-methoxy-quinoline
30. 4,7-dichloro-3-methoxy-quinoline
31. 4,7-dichloro-5-methoxy-quinoline
32. 4,7-dichloro-5-hydroxy-quinoline
33. 4,7-dichloro-6-methoxy-quinoline
34. 4,7-dichloro-6-hydroxy-quinoline
35. 4,7-dichloro-8-methoxy-quinoline
36. 4-chloro-5-hydroxy-quinoline
37. 4-chloro-5-methoxy-quinoline
38. 4-chloro-7-methoxy-quinoline
39. 4-chloro-8-methoxy-quinoline
40. 4-chloro-6,7-dimethoxy-quinoline
41. 4-chloro-5-amino-quinoline
42. 4-chloro-7-amino-quinoline
43. 4-chloro-8-amino-quinoline
44. 4-chloro-7-bromo-quinoline
45. 4-chloro-7-iodo-quinoline
46. 4,6,7,8-tetrachloro-quinoline
47. 4-chloro-7-hydroxy-quinoline
48. 4-chloro-8-hydroxy-quinoline
49. 2-phenyl-4-chloro-quinoline
50. 2-phenyl-4-chloro-6-methoxy-quinoline
51. 2-phenyl-4-chloro-7-methoxy-quinoline
52. 2-phenyl-4,7-dichloro-quinoline
53. 2-phenyl-4-chloro-6,7-dimethyl-quinoline
54. 2-phenyl-4-chloro-5,6-dimethoxy-quinoline
55. 2-phenyl-4-chloro-7-cyano-quinoline
56. 3,6-dimethyl-4-chloro-quinoline
57. 3,7-dimethyl-4-chloro-quinoline
58. 3,5-dimethyl-4-chloro-quinoline
59. 3,8-dimethyl-4-chloro-quinoline
60. 3-methyl-4-chloro-5-methoxy-quinoline
61. 3-methyl-4-chloro-7-methoxy-quinoline
62. 3,6-dimethyl-4,7-dichloro-quinoline
63. 2-n-propyl-4-chloro-quinoline
64. 2-isopropyl-4-chloro-quinoline
65. 4-chloro-8-ethyl-quinoline
66. 4-chloro-8-n-propyl-quinoline
67. 4-chloro-8-isopropyl-quinoline
68. 4-chloro-7-n-propyl-quinoline
69. 4-chloro-7-isopropyl-quinoline
70. 4-chloro-6,7-dimethyl-quinoline
71. 4-chloro-7-fluoro-quinoline
72. 3-phenyl-4,7-dichloro-quinoline
73. 2 - (4'diethylamino - phenyl) - 4,7 - dichloro-quinoline
74. 2-(4'-diethylamino - phenyl) - 4 - chloro - 7-methoxy-quinoline
75. 2-(4'-diethylamino - phenyl) - 4 - chloro - 6-methoxy-quinoline In addition to the compounds specifically referred to under Examples 1 to 3, the following are representative examples of the class of compounds constituting our invention, it being understood that while they are listed as the free base, the invention includes the salts also as hereinbefore stated:

1. 5,6-dimethoxy-4-(4'-hydroxy-3' - diethylaminomethylphenylamino) quinoline
2. 7-cyano-4-(4' - hydroxy - 3' - diethylaminomethylphenylamino) quinoline
3. 6-β-hydroxyethoxy-(4' - hydroxy - 2',5' - dimethyl - 3' - diethylaminomethylphenylamino) quinoline
4. 6-chloro-4-(4'-hydroxy-2',5' - dichloro - 3'-diethylaminomethylphenylamino) quinoline
5. 2-chloro-4-(4'-hydroxy - 3' - diethylaminomethylphenylamino) quinoline
6. 6-dimethylamino-4-(4' - hydroxy - 2',5' - dimethoxy-3' - diethylaminomethylphenylamino) quinoline
7. 7-bromo-4-(4'-hydroxy-2'-methyl - 5'-methoxy - 3' - diethylaminomethylphenylamino) quinoline
8. 2-phenyl-6-methoxy-4-(4'-hydroxy - 3' - diethylaminomethylphenylamino) quinoline
9. 2-phenyl-7-methoxy-4 - (4' - hydroxy - 2'-chloro-5'-methoxy-3' - diethylaminomethylphenylamino) quinoline
10. 8-β-hydroxyethoxy-4-(4'-hydroxy-5' - chloro - 3' - diethylaminomethylphenylamino) quinoline
11. 8-chloro-4-(4'-hydroxy-5' - methyl - 3' - diethylaminomethylphenylamino) quinoline
12. 6,7,8-trichloro-4-(2'-hydroxy - 3' - diethylaminomethylphenylamino) quinoline
13. 3-methyl-6-chloro-4-(4'-hydroxy-2' - cyano-3'-diethylaminomethylphenylamino) quinoline
14. 3-methoxy-7-chloro-4-(4'-hydroxy-5' - allyl-3'-diethylaminomethylphenylamino) quinoline
15. 8-methoxy-4-[4'-hydroxy-3'-di(β - hydroxyethyl) aminomethylphenylamino] quinoline
16. 5-methoxy-7-chloro-4-(4' - hydroxy - 2',5'-6'-trichloro-3' - diethylaminomethylphenylamino) quinoline
17. 5-hydroxy-7-chloro-4 - (4' - hydroxy - 2'-methyl-3' - diethylaminomethylphenylamino) quinoline
18. 7-chloro-8-methoxy-4-(4'-hydroxy - 3' - diethylaminomethylphenylamino) quinoline
19. 7-methoxy-4-(4'-hydroxy - 3' - diethylaminomethylphenylamino) quinoline
20. 8-methoxy-4-(4'-hydroxy - 2' - diethylamino - 3' - diethylaminomethylphenylamino) quinoline
21. 7-iodo-4-(4'-hydroxy-3' - diethylaminomethylphenylamino) quinoline
22. 2-phenyl-7-chloro-4-(4'-hydroxy - 3' - diethylaminomethylphenylamino) quinoline
23. 2-phenyl-6,7-dichloro-4 - (4' - hydroxy-3'-diethylaminomethylphenylamino) quinoline
24. 3,8-dimethyl-4-(2'-hydroxy-3' - phenyl - 4'-diethylaminomethylphenylamino) quinoline
25. 2-(p-diethylaminophenyl)-7-chloro-4 - (4'-hydroxy-3' - diethylaminomethylphenylamino) quinoline The intermediate aminomethylaminophenols herein referred to as compounds A are usually prepared from acylaminophenols by means of the Mannich reaction (Organic Reactions, John Wiley & Sons, Inc., New York, 1942, vol. I, p. 303). This particular application of the reaction consists in the condensation of primary or secondary amines with formaldehyde and acylaminophenols having at least one unsubstituted position ortho or para to the phenolic hydroxyl. The resulting N-substituted aminomethylacylaminophenols are hydrolyzed with mineral acid to the corresponding aminomethylaminophenols. The same intermediates can be prepared by catalytic or metal-acid reduction of aminomethylnitrophenols, also obtained by means of the Mannich reaction.

The 4-chloroquinolines herein referred to as compounds B can be prepared by the method of Magidson and Rubstov [J. Gen. Chem. (USSR), 7, 1896 (1937); C. A., 32, 564 (1938)] or from the corresponding hydroxyquinolines which may be prepared by the method of Gould and Jacobs [J. Am. Chem. Soc., 61, 2890 (1939)] or by that of Theos J. Thompson [M. S. Thesis, University of Nebraska, July 24, 1942].

For the preparation of the intermediate primary aminomethyl nitrophenols, the method of Einhorn [Ann., 343, 238 (1906)] involving a condensation of N-methylolbenzamide with nitrophenols is used. The desired aminomethylaminophenols are then obtained by reduction of the intermediate N-benzoylaminomethyl nitrophenols followed by acid hydrolysis.

For the preparation of quinoline intermediates with substituents in the 2-position such as the 2-phenyl derivatives, the method of Knorr [Ann., 245, 378 (1888)] involving the reaction of aniline or substituted anilines with benzoyl acetic ester is used. The 3-substituted-4-hydroxy quinolines are prepared by the method given in United States Patent No. 2,233,970.

Attention is directed to our copending applications wherein certain quinoline compounds related to those of the instant case are described and claimed as follows: Serial No. 576,900, filed Feb. 8, 1945; Serial Nos. 626,906, 626,907 and 626,908, all filed Nov. 5, 1945; and Serial No. 722,474, filed Jan. 16, 1947.

What we claim as our invention is:

1. A compound of the class consisting of a free base and its acid addition salts, said free base having the following formula

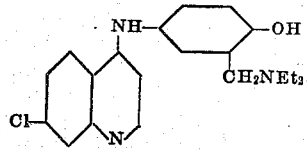

2. A compound of the class consisting of a free base and its acid addition salts, said free base having the following formula

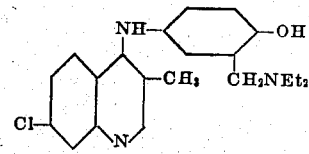

3. A compound of the class consisting of a free base and its acid addition salts, said free base having the following formula

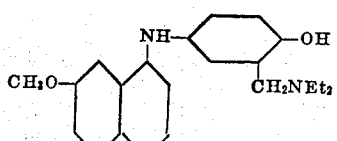

4. A compound having the formula

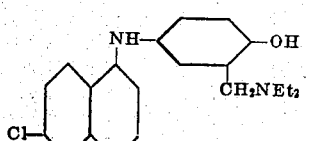

5. A compound having the formula

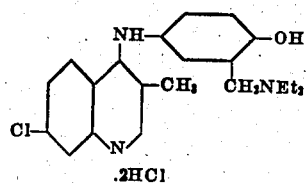

6. A compound having the formula

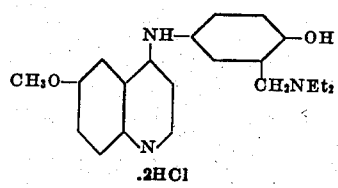

7. A compound of the class consisting of a free base and its acid addition salts, said free base having the formula,

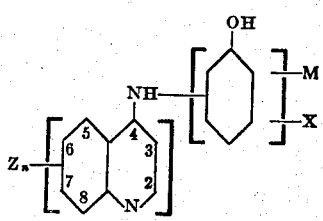

where $Z_n$ represents $n$ substituents Z, $n$ being an integer of the group consisting of one, two and three, Z is a substituent of the class consisting of —$NO_2$, unsubstituted amino, alkyl-substituted amino, groups hydrolyzable to amino, —OH, —CN, halogen, lower alkyl, lower alkoxy, lower hydroxy alkyl, phenyl and amino substituted phenyl, M is a group attached to the aryl nucleus in one of the positions ortho and para to the hydroxy group, the group M having the formula,

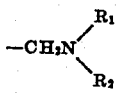

in which $R_1$ and $R_2$ are radicals containing 1 to 4 carbon atoms of the class consisting of saturated alkyl, unsaturated alkyl and hydroxyalkyl, X is a member of the class consisting of hydrogen, chlorene, bromine, hydroxy, lower alkoxy, lower alkyl, lower alkylene, phenyl and M.

8. A compound of the class consisting of a free base and its acid addition salts, said free base having the formula

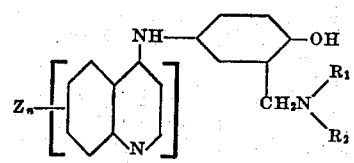

where $Z_n$ represents $n$ substituents Z, $n$ being an integer of the group consisting of one, two and three, Z is a substituent of the class consisting of —$NO_2$, unsubstituted amino, alkyl-substituted amino, groups hydrolyzable to amino, —OH, —CN, halogen, lower alkyl, lower alkoxy, lower hydroxy alkyl, phenyl and amino substituted phenyl, and $R_1$ and $R_2$ are radicals containing 1 to 4 carbon atoms of the class consisting of saturated alkyl, unsaturated alkyl and hydroxy alkyl.

9. Process for preparing a compound having the formula,

[structure: aryl-NH-[ring]-M with X, Z_n substituents]

which comprises condensing a compound having the formula

[structure: H₂N-[ring(OH)]-M with X]

with a compound having the formula

[structure: quinoline with Hal, Z_n]

where $Z_n$ represents $n$ substituents Z, $n$ being an integer of the group consisting of one, two and three, Z is a substituent of the class consisting of —NO$_2$, unsubstituted amino, alkyl-substituted amino, groups hydrolyzable to amino, —OH, —CN, halogen, lower alkyl, lower alkoxy, lower hydroxy alkyl, phenyl and amino substituted phenyl, M is a group attached to the aryl nucleus in one of the positions ortho and para to the hydroxy group, the group M having the formula, $$-CH_2N\begin{matrix}R_1\\R_2\end{matrix}$$

in which $R_1$ and $R_2$ are radicals containing 1 to 4 carbon atoms of the class consisting of saturated alkyl, unsaturated alkyl and hydroxyalkyl, X is a member of the class consisting of hydrogen, chlorine, bromine, hydroxy, lower alkoxy, lower alkyl, lower alkylene, phenyl and M.

10. Process for preparing a compound of the formula,

[structure: 7-chloro-4-(2-hydroxy-5-aminobenzylamino) quinoline with CH₂NEt₂]

which comprises condensing a compound of the formula

[structure: 4-amino-2-hydroxy benzyl-NEt₂]

with a compound having the formula

[structure: 4,7-dichloroquinoline]

11. Process for preparing a compound of the formula,

[structure: chloroquinoline-NH-phenol with CH₃, CH₂NEt₂]

which comprises condensing a compound of the formula

[structure: aminophenol with CH₂NEt₂]

with a compound having the formula

[structure: dichloroquinoline with CH₃]

12. Process for preparing a compound of the formula,

[structure: methoxyquinoline-NH-phenol with CH₂NEt₂]

which comprises condensing a compound of the formula

[structure: aminophenol with CH₂NEt₂]

with a compound having the formula

[structure: 4-chloro-methoxyquinoline]

JOSEPH H. BURCKHALTER.
ELDON M. JONES.
ALBERT L. RAWLINS.
FRANK H. TENDICK.
WALTER F. HOLCOMB.

REFERENCES CITED

The following references are of record in the file of this patent:

UNITED STATES PATENTS

| Number | Name | Date |
|---|---|---|
| 1,891,980 | Hartmann | Dec. 27, 1932 |
| 1,896,461 | Muth | Feb. 7, 1933 |
| 1,902,103 | Schonhofer | Mar. 21, 1933 |

FOREIGN PATENTS

| Number | Country | Date |
|---|---|---|
| 533,691 | Germany | Sept. 23, 1931 |